United States Patent
Manula et al.

(10) Patent No.: US 9,384,072 B2
(45) Date of Patent: Jul. 5, 2016

(54) DISTRIBUTED QUEUE PAIR STATE ON A HOST CHANNEL ADAPTER

(71) Applicant: Oracle International Corporation, Redwood City, CA (US)

(72) Inventors: Brian Edward Manula, Oslo (NO); Magne Vigulf Sandven, Ski (NO)

(73) Assignee: Oracle International Corporation, Redwood Shores, CA (US)

(*) Notice: Subject to any disclaimer, the term of this patent is extended or adjusted under 35 U.S.C. 154(b) by 701 days.

(21) Appl. No.: 13/721,671

(22) Filed: Dec. 20, 2012

(65) Prior Publication Data

US 2014/0181232 A1 Jun. 26, 2014

(51) Int. Cl.
*G06F 15/16* (2006.01)
*G06F 9/54* (2006.01)
*H04L 29/06* (2006.01)
*G06F 12/08* (2016.01)
*G06F 12/00* (2006.01)

(52) U.S. Cl.
CPC ............ *G06F 9/546* (2013.01); *G06F 12/0833* (2013.01); *G06F 12/0837* (2013.01); *H04L 29/06027* (2013.01); *G06F 2209/548* (2013.01); *G06F 2212/6046* (2013.01)

(58) Field of Classification Search
USPC .................. 709/213–216, 223–229, 250, 231; 711/118
See application file for complete search history.

(56) References Cited

U.S. PATENT DOCUMENTS

| | | | |
|---|---|---|---|
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,917,987 B2 | 7/2005 | Parthasarathy et al. | |
| 7,136,353 B2 | 11/2006 | Ha et al. | |
| 7,330,918 B2 | 2/2008 | Yamamoto et al. | |
| 7,496,698 B2 | 2/2009 | Biran et al. | |
| 7,609,636 B1 | 10/2009 | Mott | |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,787,366 B2 | 8/2010 | Cuffaro et al. | |
| 7,817,634 B2 | 10/2010 | Coffman et al. | |
| 7,830,919 B1 | 11/2010 | Thompson | |
| 7,899,050 B2 | 3/2011 | Craddock et al. | |
| 7,990,994 B1 * | 8/2011 | Yeh .................... H04L 12/4641 370/431 |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |
| 8,296,386 B1 | 10/2012 | Micalizzi, Jr. | |

(Continued)

*Primary Examiner* — Zarni Maung
(74) *Attorney, Agent, or Firm* — Osha Liang LLP (57) ABSTRACT

A method for managing a distributed cache of a host channel adapter (HCA) that includes receiving a work request including a QP number, determining that a QP state identified by the QP number is not in the distributed cache, retrieving the QP state from main memory, and identifying a first portion and a second portion of the QP state. The method further includes storing the first portion into a first entry of a first sub-cache block associated with the first module, where the first entry is identified by a QP index number, storing the second portion into a second entry of a second sub-cache block associated with the second module, where the second entry is identified by the QP index number; and returning the QP index number of the QP state to the first module and the second module.

11 Claims, 7 Drawing Sheets

(56) References Cited

U.S. PATENT DOCUMENTS

| | | |
|---|---|---|
| 2001/0036185 A1 | 11/2001 | Dempo |
| 2003/0101158 A1 | 5/2003 | Pinto et al. |
| 2005/0018669 A1 | 1/2005 | Arndt et al. |
| 2005/0060443 A1 | 3/2005 | Rosner |
| 2005/0135419 A1 | 6/2005 | Pullen et al. |
| 2005/0223118 A1 | 10/2005 | Tucker et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2008/0189432 A1* | 8/2008 | Abali .................... G06F 9/4856 709/238 |
| 2009/0077567 A1* | 3/2009 | Craddock ........... G06F 13/4022 719/314 |
| 2009/0125604 A1 | 5/2009 | Chang et al. |
| 2011/0216648 A1 | 9/2011 | Mehrotra et al. |
| 2012/0239832 A1 | 9/2012 | Subramanian et al. |
| 2012/0307838 A1* | 12/2012 | Manula ................ H04L 49/358 370/412 |
| 2014/0181232 A1* | 6/2014 | Manula .................. G06F 9/546 709/213 |
| 2014/0181409 A1* | 6/2014 | Manula ................ G06F 12/123 711/133 |
| 2014/0181823 A1* | 6/2014 | Manula .................. G06F 9/546 718/102 |

\* cited by examiner

_(54)_ DISTRIBUTED QUEUE PAIR STATE ON A HOST CHANNEL ADAPTER

BACKGROUND OF INVENTION

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made up of a collection of switches, routers, and/or links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using queue pairs. Each of the processes has a queue pair configured to communicate with the queue pair of the other process. A queue pair includes a send queue and a receive queue. Specifically, in order for a process to send a message to another process, the process posts the message to the send queue. The host channel adapter sends the message in the form of packets to the channel adapter having the receive queue. To enable multiple processes to simultaneously communicate using the same hardware, it is necessary to quickly switch between queue pairs. To facilitate this, the connection metadata that a queue pair requires to function is stored in a data structure known as a queue pair state. A queue pair state allows the hardware to quickly switch between different connections by accessing the information stored in different queue pair states.

SUMMARY OF INVENTION

In general, in one aspect, the invention relates to a method for managing a distributed cache of a host channel adapter (HCA). The method includes receiving a work request including a QP number, and determining that a QP state identified by the QP number is not in the distributed cache. The QP state includes data fields, and the distributed cache includes sub-cache blocks. The method further includes retrieving the QP state from main memory, and identifying a first portion and a second portion of the QP state. The first portion includes a first subset of the data fields required by a first module of the HCA, and wherein the second portion includes a second subset of the data fields required by a second module of the HCA. The method further includes storing the first portion into a first entry of a first sub-cache block associated with the first module, where the first entry is identified by a QP index number, storing the second portion into a second entry of a second sub-cache block associated with the second module, where the second entry is identified by the QP index number; and returning the QP index number of the QP state to the first module and the second module.

In general, in one aspect, embodiments relate to a host channel adapter (HCA) that include modules including a first module, configured to perform a first task, and a second module, configured to perform a second task. The HCA further includes sub-cache blocks for storing a plurality of queue pair (QP) states, where the sub-cache blocks includes a first sub-cache block, associated with the first module and a second sub-cache block, associated with the second module. The first sub-cache block includes a first entry, identified by a QP index number and configured to store a first portion of a QP state, and the second sub-cache block includes a second entry, identified by the QP index number and configured to store a second portion of the QP state.

In general, in one aspects, embodiments of the invention relate to a system that includes a host including a processor and a main memory for storing QP states. The system further includes a host channel adapter (HCA) operatively connected to the host and including modules including a first module, configured to perform a first task, and a second module, configured to perform a second task. The HCA further includes sub-cache blocks including a first sub-cache block, associated with the first module, including a first entry, identified by a QP index number and configured to store a first portion of a QP state, and a second sub-cache block, associated with the second module, including a second entry, identified by the QP index number and configured to store a second portion of the QP state.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed to a distributed cache on a host channel adapter (HCA) that includes multiple modules for processing work requests. The distributed cache caches queue pair (QP) states for one or more queue pairs. Each module of the HCA is associated with a sub-cache block of the distributed cache. The module accesses the corresponding or associated sub-cache block to use the QP state to process the work requests. Specifically, the portion of the QP state, which the module uses, is stored in the sub-cache block associated with the module. In one or more embodiments of the invention, each QP state stored on the distributed cache has portions stored in a location specified by the same QP index number of each sub-cache block. In such embodiments, for any particular QP state, each module uses the same QP index number as the other modules to access the particular QP state. In one or more embodiments of the invention, logic for the distributed cache is centralized. Only the memory portion and logic for accessing the particular memory portion given a particular QP index number is in the sub-cache block. In such embodiments, the sub-cache block does not include logic for determining when or which entries to replace in the sub-cache block or where to store new entries. Rather, such logic is centralized in one or more embodiments of the invention.

By way of an overview, a communication system may include a transmitting system and a receiving system, which each are any type of physical computing device connected to the Infiniband® network. By way of an example of the transmitting system and the receiving system, the transmitting system and/or a receiving system may be a host system, such as the host system described in FIG. 1 and below. In one or more embodiments of the invention, for a particular message, the transmitting system is a system that sends the message and the receiving system is a system that receives the message. In other words, the use of the words, "transmitting" and "receiving", refer to the roles of the respective systems for a particular message. The roles may be reversed for another message, such as a response sent from receiving system to transmitting system. For such a message, the receiving system becomes a transmitting system and the transmitting system becomes a receiving system. Thus, communication may be bi-directional in one or more embodiments of the invention. In one or more embodiments of the invention, one or more messages may include a work request. A work request is a request to perform an action.

The work request may be directed to an application or the HCA (discussed below) that is interposed between the device executing application and the network. Specifically, the transmitting system and the receiving system include a requestor application and a responder application, respectively. The requestor application is the application that sends the message and the responder application is the application that receives the message.

Applications communicate using QPs. Specifically, each application includes a send queue and a receive queue which together make a QP. Each QP includes functionality to communicate exclusively to a matched QP associated with a different application. The send queue of the QP is set up to send data packets to the receive queue of the matched QP, and vice versa.

Figure 1:
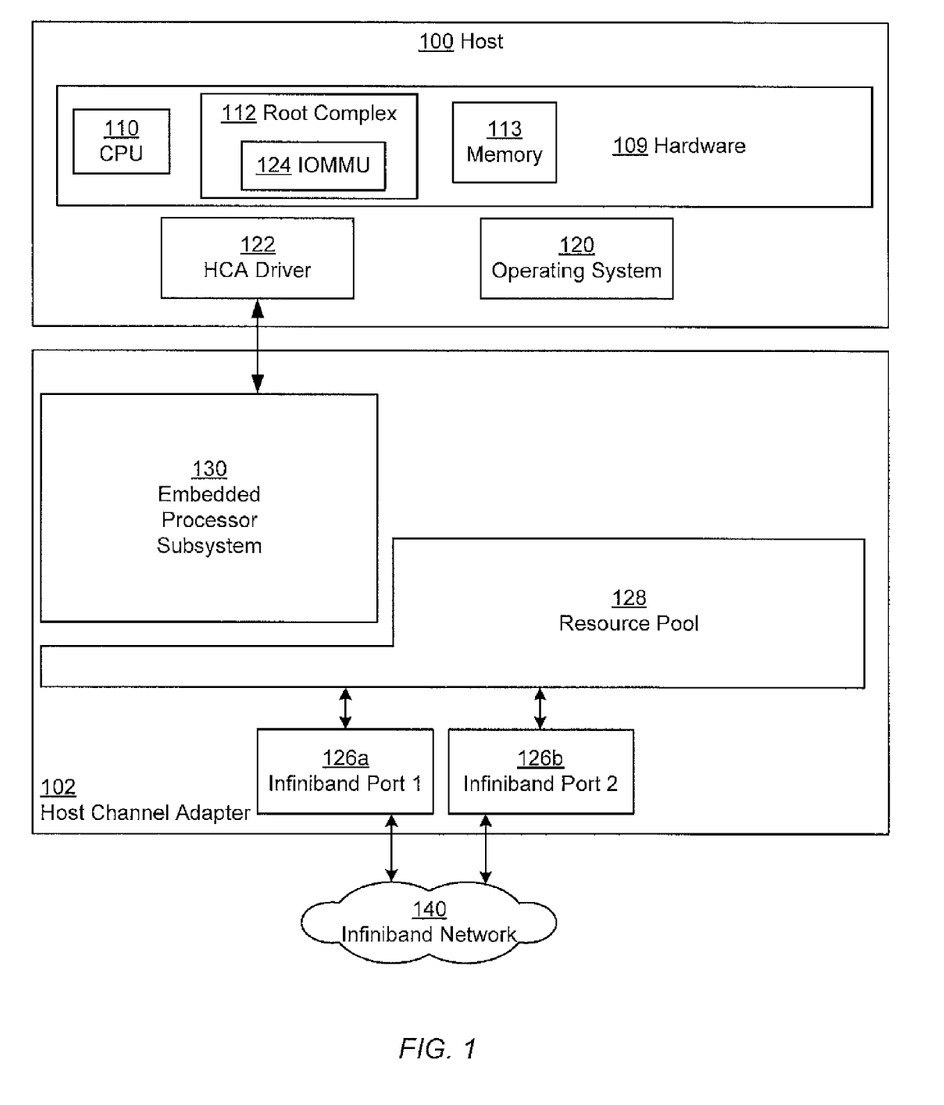
FIG. 1 shows a host system in accordance with one or more embodiments of the invention.

FIG. 1 shows a schematic diagram of a host system (100) in one or more embodiments of the invention. In one or more embodiments of the invention, the host system (100) is any physical computing device. Specifically, the host system (100) includes at least a minimum amount of hardware necessary to process instructions to perform one embodiment of the invention. As shown in FIG. 1, the host system (100) includes a host (100) and an HCA (102) in one or more embodiments of the invention. These components are discussed below.

In one or more embodiments of the invention, the host (100) includes an HCA driver (122), and operating system (120), and a root complex (112). In one or more embodiments of the invention, the HCA driver (122) is software that provides an interface to the HCA (102) for the operating system (120). Specifically, when the operating system (120), on its own behalf or on behalf of an application, wants to send work requests to the HCA (102), the operating system (120) invokes a routine in the HCA driver (122).

Continuing with the host, the host (100) includes hardware (109). The hardware (109) may include, for example, a central processing unit (CPU) (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores. In general, the CPU (110) is any device configured to execute instructions on the host (100).

In one or more embodiments of the invention, the memory (113) is any type of hardware device for storage of data. In one or more embodiments of the invention, the memory (113) may be partitioned. In one or more embodiments of the invention, the memory (113) includes functionality to store a complete set of QP states. Specifically, the QP state for all QPs of the host are stored in memory in one or more embodiments of the invention.

In one or more embodiments of the invention, a QP state includes information about the status and control information about the QP. In one or more embodiments of the invention, the QP state includes multiple data fields. Each data field is a particular item of the QP state. In other words, each data field may provide a granular piece of data about the corresponding QP. For example, the data fields of a QP state may correspond to status and control information for the send queue and receive queue corresponding to the QP, the number of pending requests, size of the send queue, a QP number for the remote node (i.e., the node with which the application is communicating using the QP), one or more sequence numbers (e.g., send queue sequence number, completion queue sequence number), where data from a last packet is stored in memory, an index to one or more descriptors, acknowledgement timeout period for how long before an acknowledgement is expected from the responder before retransmission, and parameters for whether certain actions are enabled for the QP (e.g., whether remote direct memory access (RDMA) read is enabled, whether RDMA write is enabled, whether atomic operations are enabled, and whether other actions are enabled). The QP state may include other data fields without departing from the scope of the invention In one or more embodiments of the invention, the root complex (112) includes functionality to connect the CPU and memory subsystem to a peripheral component interconnect (PCI) Express switch fabric. Specifically, in one or more embodiments of the invention, the root complex (112) connects the host (100) to the HCA (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) input/output (I/O) bus to the memory. In one or more embodiments of the invention, the IOMMU (124) includes functionality to translate addresses from one level of abstraction to another.

Continuing with FIG. 1, the host (100) is connected to the HCA (102). In one or more embodiments of the invention, the connection between the host (100) and the HCA (102) may be a PCI express connection. Specifically, the HCA may connect to a PCI express fabric connector on the host.

In one or more embodiments of the invention, the HCA (102) is a hardware device configured to connect the host (100) to the Infiniband® network (140). Specifically, the HCA (102) includes functionality to receive work requests from the host (100) and process the work requests. Processing the work requests may include performing DMA with host memory to obtain and store packet data and to obtain control information, performing any validation required on the packet data, generating packets from the packet data, and sending and receiving packets on the Infiniband® network (140).

Figure 2:
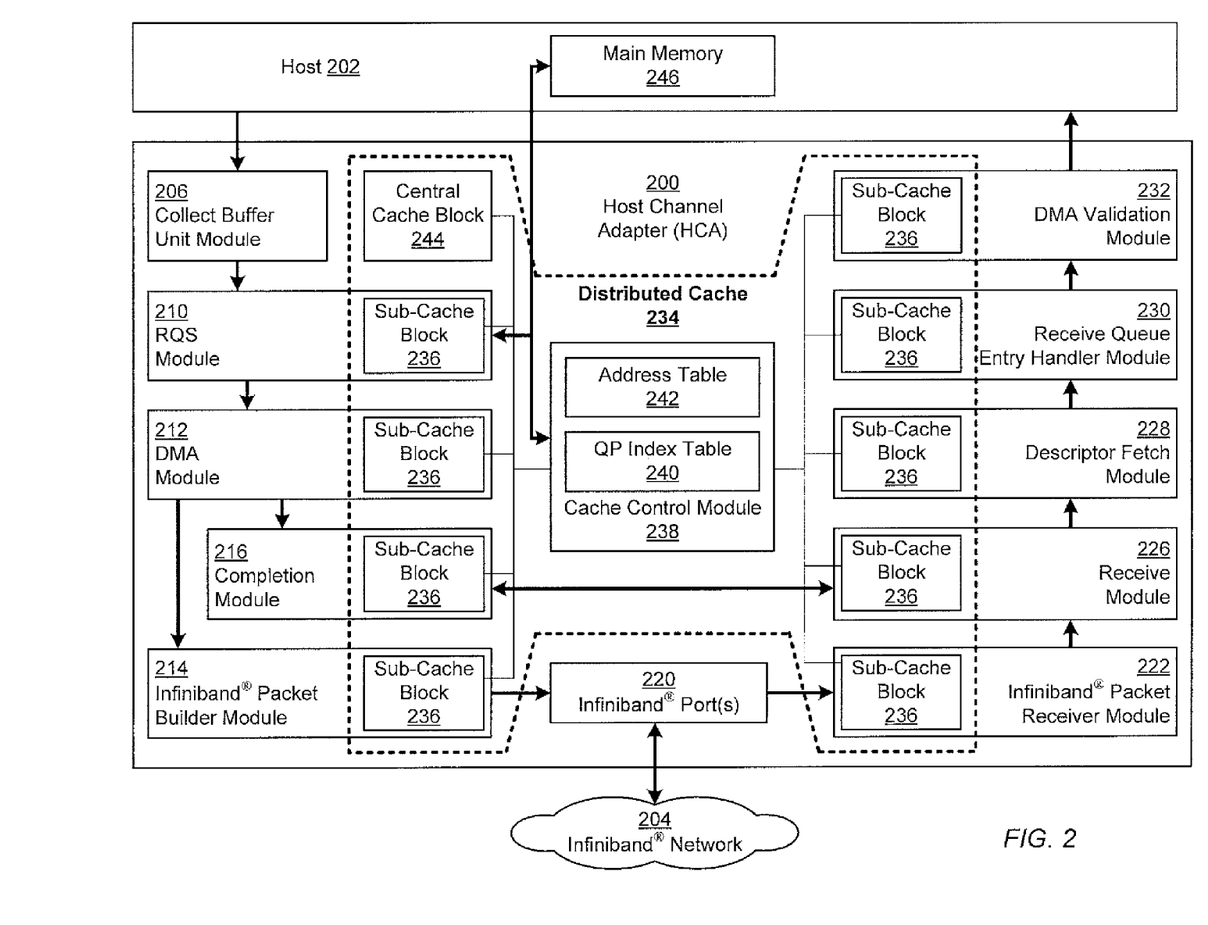
FIG. 2 shows a host channel adaptor, including a distributed cache, in accordance with one or more embodiments of the invention.

Continuing with FIG. 1, FIG. 1 shows a schematic diagram of the HCA (102) from the prospective of the host (100). As shown in FIG. 1, the HCA (102) includes at least one Infiniband® port (e.g., Infiniband® port 1 (126*a*), Infiniband® port 2 (126*b*)), a resource pool (128), and an embedded processor subsystem (130). Each of the components of the HCA is discussed below.

In one or more embodiments of the invention, an Infiniband® port (e.g., Infiniband® port 1 (126*a*), Infiniband® port 2 (126*b*)) is a physical interface connector between the HCA (102) and the Infiniband® network (140). Although FIG. 1 shows two Infiniband® ports, a different number of ports may exist without departing from the invention.

The resource pool (128) is a collection of resources that are required to send and receive packets on the Infiniband® network. Specifically, the resource pool (128) corresponds to the collection of hardware and stored data that is accessible by the host (100) and may be shared among virtual machines on the host (100). The resource pool (128) is discussed in FIG. 2 below.

The embedded processor subsystem (130) corresponds to processing logic for executing instructions on the HCA (102). In one or more embodiments of the invention, the embedded processor subsystem includes an embedded processor that includes functionality to execute software or firmware.

FIG. 2 shows a schematic diagram of a HCA (200) connecting a host (202) having main memory (246) to an Infiniband® network (204) in one or more embodiments of the invention. The host, network, and memory may correspond to the like named components of FIG. 1.

As shown in FIG. 2, the HCA (200) may include multiple modules. Each module includes functionality to perform a task for processing a work request. The multiple modules may include one or more of a collect buffer unit module (206), a receive queue scheduler (RQS) module (210), a direct memory access (DMA) module (212), an Infiniband® packet builder module (214), one or more Infiniband® ports (220), a completion module (216), an Infiniband® packet receiver module (222), a receive module (226), a descriptor fetch module (228), a receive queue entry handler module (230), and a DMA validation module (232). The respective modules correspond to both transmitting processing logic for sending messages on the Infiniband® network (204) and receiving processing logic for receiving messages from the Infiniband® network (204). In one or more embodiments of the invention, the collect buffer unit module (206), RQS module (210), direct memory access (DMA) module (212), Infiniband® packet builder module (214), and completion module (216) may be components of the transmitting processing logic.

In one or more embodiments of the invention, each module may correspond to hardware and/or firmware. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message. A command or received message may be considered a work request.

The dark arrows between modules show the transmission path of data units between modules as part of processing work requests and received messages in one or more embodiments of the invention. Data units may have other transmission paths (not shown) without departing from the invention. Further, other communication channels and/or additional components of the HCA (200) may exist without departing from the invention. Each of the components of the resource pool is discussed below.

The collect buffer controller module (206) includes functionality to receive work request data from the host and store the work request data on the HCA. Specifically, the collect buffer controller module (206) is connected to the host and configured to receive the work request from the host and store the work request in a buffer. When the work request is received, the collect buffer controller module is configured to issue a kick that indicates that the work request is received.

In one or more embodiments of the invention, the RQS module (210) includes functionality to load balance work requests received from applications and to obtain QP state information for the QP corresponding to the data unit. Further, the RQS module (210) may include functionality to inform the cache control module (238) of the new queue pair state.

In one or more embodiments of the invention, the DMA module (212) includes functionality to perform DMA with host memory. The DMA module may include functionality to determine whether a work request in a data unit or referenced by a data unit identifies a location in host memory that includes payload. The DMA module may further include functionality to validate that the process sending the work request has necessary permissions to access the location, and to obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® packet builder module (214). In one or more embodiments of the invention, the Infiniband® packet builder module includes functionality to generate one or more packets for each data unit and to initiate transmission of the one or more packets on the Infiniband® network (204) via the Infiniband® port(s) (220). In one or more embodiments of the invention, the Infiniband® packet builder module may include functionality to obtain the payload from a buffer corresponding to the data unit, from the host memory, and from an embedded processor subsystem memory.

In one or more embodiments of the invention, the completion module (216) includes functionality to generate completions for work requests. For example, the completion module may include functionality to manage packets for QPs set in reliable transmission mode. Specifically, in one or more embodiments of the invention, when a QP is in a reliable transmission mode, then the receiving channel adapter of a new packet responds to the new packet with an acknowledgement message indicating that transmission completed or an error message indicating that transmission failed. The completion module (216) includes functionality to manage data units corresponding to packets until an acknowledgement is received or transmission is deemed to have failed (e.g., by a timeout).

In one or more embodiments of the invention, the Infiniband® packet receiver module (222) includes functionality to receive packets from the Infiniband® port(s) (220). In one or more embodiments of the invention, the Infiniband® packet receiver module (222) includes functionality to perform a checksum to verify that the packet is correct, parse the headers of the received packets, and place the payload of the packet in memory. In one or more embodiments of the invention, the Infiniband® packet receiver module (222) includes functionality to obtain the QP state for each packet from a QP state cache. In one or more embodiments of the invention, the Infiniband® packet receiver module includes functionality to transmit a data unit for each packet to the receive module (226) for further processing.

In one or more embodiments of the invention, the receive module (226) includes functionality to validate the QP state obtained for the packet. The receive module (226) includes functionality to determine whether the packet should be accepted for processing. In one or more embodiments of the invention, if the packet corresponds to an acknowledgement or an error message for a packet sent by the HCA (200), the receive module includes functionality to update the completion module (216).

Additionally or alternatively, the receive module (226) includes a queue that includes functionality to store data units waiting for one or more reference(s) to buffer location(s) or waiting for transmission to a next module. Specifically, when a process in a virtual machine is waiting for data associated with a QP, the process may create receive queue entries that reference one or more buffer locations in host memory in one or more embodiments of the invention. For each data unit in the receive module, the receive module includes functionality to identify the receive queue entries from a HCA cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the HCA (200) or in host memory.

In one or more embodiments of the invention, the DMA validation module (232) includes functionality to perform DMA validation and initiate DMA between the HCA and the host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (232) includes functionality to initiate DMA with host memory when the DMA is validated.

Continuing with FIG. 2, the HCA (200) includes a distributed cache (234) in one or more embodiments of the invention. The distributed cache (234) includes functionality to store a portion of the QP states in memory (246) on the HCA (200). The distributed cache (234) includes a cache controller module (238) and multiple sub-cache blocks (236A-I). Each sub-cache block (236A-I) is associated with a module of the packet processing pipeline of the HCA (200). In other words, each module has a single corresponding sub-cache block that the module accesses. In one or more embodiments of the invention, each sub-cache is only accessed by the single module. Thus, a one-to-one relationship may exist between modules and sub-cache blocks. Additionally, the cache control module (238) may include a QP index table (240) and an address table (242), which store QP state locations within the cache and memory, respectively. In one embodiment of the invention, the distributed cache (234) includes a central cache block (244) The address table (242) and QP index table (240) may be stored within the central cache block (244).

In one or more embodiments of the invention, a sub-cache block (236) is a distinct physical cache that is associated with a module of the HCA (200). A sub-cache block (236) may be static random-access memory (SRAM), dynamic random-access memory (DRAM), or any similar type of memory or temporary storage. A sub-cache block (236) may be located within the module with which it is associated. Alternately, a sub-cache block (236) may be located immediately adjacent to its associated module. In one or more embodiments of the invention, each sub-cache block (236) may be a partition of a single, monolithic physical cache. The management of the sub-cache blocks (236) may be handled directly by the cache control module (238).

Each of the sub-cache blocks (236) includes multiple entries. Each entry of a sub-cache block includes functionality to store a QP state (or a portion thereof). Each entry may include multiple data fields, and each data field stores a granular piece of the data for the QP state. The entries of every sub-cache block (236) may be identically addressed. In other words, entries of different sub-cache blocks (236) identified by the same QP index number may only store data fields from the same QP state. However, the same entry within different sub-cache blocks (236) (i.e., entries associated with the same QP index) may store different data fields. For example, a cached QP state may have data fields stored across all of the sub-cache blocks (236) of the distributed cache (234). Each of the sub-caches (236) might have an entry identified as QP index 1 and an entry identified as QP index 2. If a portion of the cached QP state is stored in the entry identified by QP index 1 in a first sub-cache block (236), then the portions of the cached QP state stored in the other sub-cache blocks (236) will only be found in the entry identified by QP index 1 of those sub-cache blocks (236). A second cached QP state may have all of its portions stored exclusively in entries of the sub-cache blocks (236) identified by QP index 2. In one or more embodiments of the invention, even though the entries are identically addressed (i.e., by identical QP index numbers) in different sub-cache blocks (236), the size of individual entries may not be consistent across the different sub-caches (236), as different modules may not require the same amount of data or the same number of data fields from a QP state. Additionally, the entries, and even the sub-cache block (236) itself, may be further divided to accommodate the varying permissions of different types of data fields.

In one or more embodiments of the invention, the distributed cache (234) includes a central cache block (244). The central cache block (244) may be compositionally and functionally the same as a sub-cache block (236), but accessible to all modules of the HCA (200). The central cache block (244) may also be configured to store the address table (242). The central cache block (244) may be further configured to store QP states that are not located in the sub-cache blocks (236). Alternately, or additionally, the central cache block (244) may include a partition addressed identically to the sub-cache blocks (236) to fulfill the role of the public sub-cache block (236). In one or more embodiments of the invention, there may be multiple central cache blocks (244), each storing different types of data. Additional central cache blocks (244) may also be used to implement a multi-level cache or other cache architecture in addition to the distributed cache (234).

The cache control module (238) is a component of the distributed cache (234) which includes the processing logic and metadata storage of the distributed cache. The cache control module (238) may be configured to communicate with the different modules of the HCA (200), the address table (242) and the QP index table (240), in addition to the sub-cache blocks (236). In one or more embodiments of the invention, the address table (242) and the QP index table (240) are integrated directly into the cache control module (238). The cache control module (238) may additionally include the central cache block (244) which may store the address table (242), the QP index table (240) and all or part of multiple QP states.

The address table (242) is a data structure within the distributed cache (234) which includes the location of every QP state in memory. The address table (242), or a portion thereof, may be located in a central cache block (244) of the distributed cache (234) along with other cached data. Alternatively or additionally, a distinct physical memory may be used to store the address table (242). In one or more embodiments of the invention, the address table may be located in main memory (246). In one or more embodiments of the invention, the QP states are stored in identically sized frames arranged linearly in main memory (246), so the location can be obtained with a simple address translation, and the address table (242) may be omitted. Other mechanisms for implementing an address table (242) or analogous data structure may be used without departing from the scope of the invention.

The QP index table (240) is a data structure located in the distributed cache (234), which includes an entry corresponding to every QP state within the distributed cache (234). Specifically, the QP index table (240) stores the QP index number of every QP state currently cached. In one or more embodiments of the invention, the QP index table associates, for each QP state in the distributed cache, the QP number with the QP index number. The QP index table (240) may be located within a centralized cache (244), a distinct physical entity, or elsewhere. In one or more embodiments of the invention, the QP index table (240) is stored in a content addressable memory (CAM, also 'associative memory') table. A CAM table is a memory structure configured to be searched using a keyword, and to return any addresses associated with the keyword. In one or more embodiments of the invention, the keyword by which the QP index table (240) is searched is a QP number.

Each index entry in the QP index table (240) may store metadata associated with the QP number. In one embodiment of the invention, the metadata may include a reference counter, configured to track the number of pending work requests associated with the QP state. In one embodiment of the invention, the distributed cache (234) has a sufficient number of entries to ensure that all QP states for which there is still a pending work request can be simultaneously cached. In one embodiment of the invention, 2 k entries may exist in each sub-cache block (236) and, subsequently, 2 k QP index numbers may exist identifying the sub-cache block. The composition and contents of the index entry may encompass a wide variety of possible implementations, which may be used, based on the requirements and capabilities of the system architecture.

In one or more embodiments of the invention, the QP index information associated with a QP state may be propagated through the modules that make up packet processing pipeline of the HCA (200) along with other meta-data associated with the work request. The QP index number of the QP state may be obtained by a request to the QP index table (240) by the RQS module (210) and the IPBR module (222) The requesting module may additionally be configured to access the address table (242) to obtain the location of the QP state in main memory (246). In one or more embodiments of the invention, the cache control module (238) may, in response to a cache miss, read the appropriate QP state into the cache, and the requesting module obtains the location by rereading the QP index table (240). Alternately, the QP index table (240) and address table may only be internally accessible to the cache control module (238), which then provides the appropriate information to the requesting module.

Figure 3:
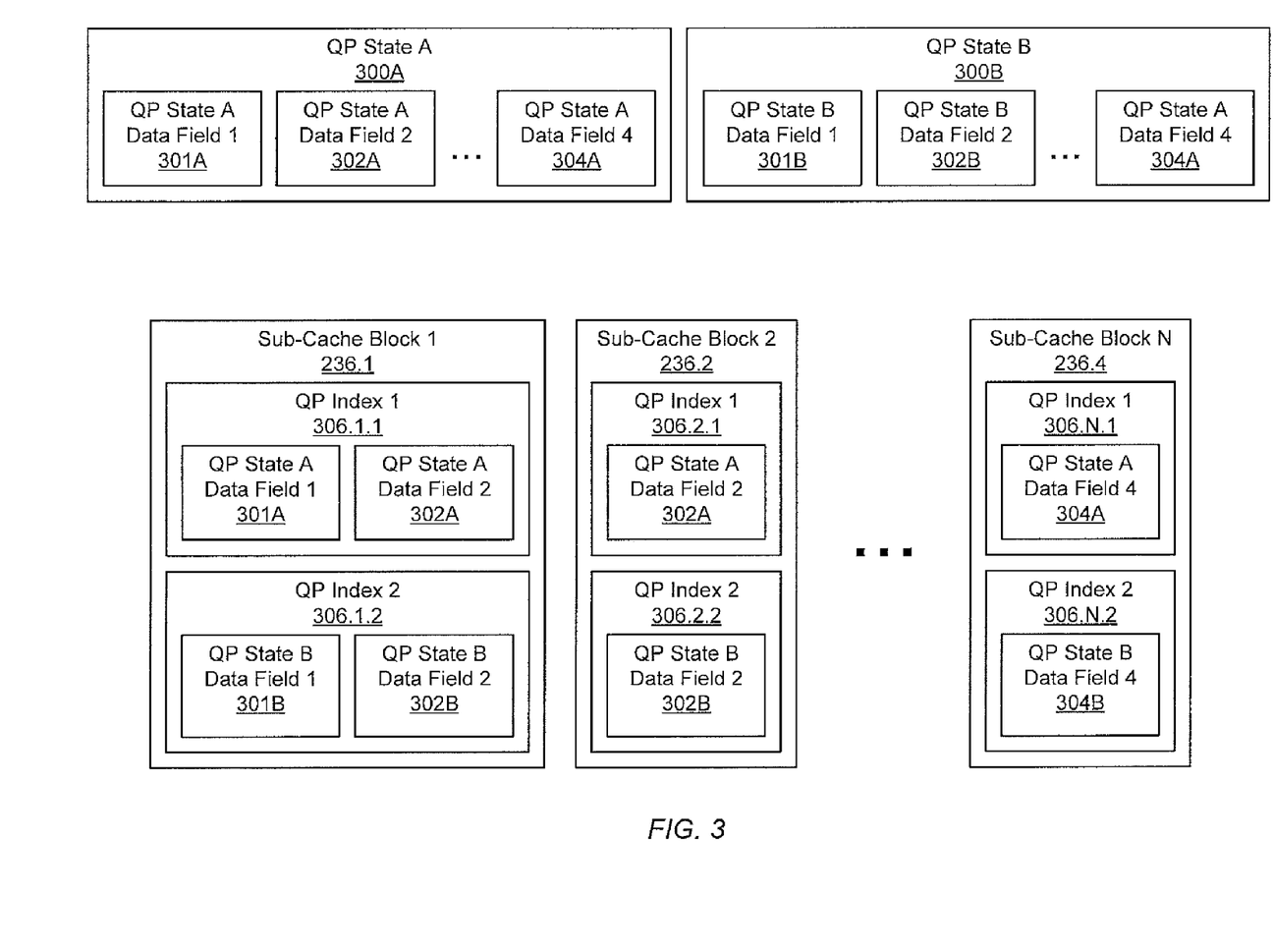
FIG. 3 shows a queue pair state in accordance with one or more embodiments of the invention.

FIG. 3 shows an example diagram of an example QP state (300A, 300B) in accordance with one embodiment of the invention. As shown in FIG. 3, the QP state may include multiple data fields (301A, 302A, 304A, 301B, 302B, 304B) in accordance with one or more embodiments of the invention. Specifically, the data stored within the QP state is arranged into data fields (301A, 302A, 304A, 301B, 302B, 304B). The information stored in a given data field (e.g., QP state A data field 2 (302A), QP state B data field 2 (302B)) may include distinct data structures used to store metadata such as a data item, or multiple related data items associated with the a particular function or requirement of the QP. In one embodiment of the invention, the data fields are used to store information related to the current contents, structure and purpose of the QP between uses. Additionally, the data fields (301A, 302A, 304A, 301B, 302B, 304B) may be used to pass information between the different modules in the pipeline. The information passed may include error alerts, indications of the availability of data, resources, or results, sequencing information, and the like. Different data fields (301A, 302A, 304A, 301B, 302B, 304B) may be stored in different sub-cache blocks (236.1, 236.2, 236.4) of the distributed cache depending on type. The data associated with a particular data field (e.g., 301A, 301B, 304A, 304B) may be stored in a single sub-cache block (236.1, 236.4). Alternately, data associated with a data field (e.g., 302A, 302B) may have multiple copies cached in various locations (e.g., 236.1, 236.2) within the distributed cache.

Different modules within the packet processing pipeline may require different combinations of the data fields (301A, 302A, 304A, 301B, 302B, 304B) in order to function. The appropriate data fields (301A, 302A, 304A, 301B, 302B, 304B) are stored in the sub-cache blocks (236.1, 236.2, 236.4) associated with the modules, which require the data.

In one embodiment of the invention, each sub-cache block (236.1) includes multiple entries (306.1.1, 306.1.2). Each of the entries (306) within a single sub-cache block (236) may store the same subset of the data fields (301A, 302A, 304A, 301B, 302B, 304B) from every QP state (300) currently cached in the distributed cache. In other words, if QP state A data field 2 (302A) is in sub-cache block 1 (236.1), then sub-cache block 1 (236.1) also includes data field 2 of each other QP state in the distributed cache. The entries (306.1.1, 306.1.2) may be identified by QP index numbers. A QP index number is an address (e.g., 0x1, 0x2) of the entry storing data associated with a QP state in a sub-cache block.

In one embodiment of the invention, different subsets of data fields (301A, 302A, 304A, 301B, 302B, 304B) from the same QP state (300A, 300B) are stored in different sub-cache blocks (236.1, 236.2, 236.N). However, data fields (301A, 302A, 304A) from a single QP state (300A) are stored in an entry (306.1.1, 306.2.1, 306.N.1) of each respective sub-cache block (236.1, 236.2, 236.N) identified by the same QP index number (306x1).

In one or more embodiments of the invention, the data fields (301A, 302A, 304A, 301B, 302B, 304B) may be categorized according to permissions for accessing the QP state. In one or more embodiments of the invention, a data field (301A, 302A, 304A, 301B, 302B, 304B), stored in the QP state may be private, read only, broadcast and public. In one or more embodiments of the invention, the data located in a data field (301, 304) falling in the 'private' category may only be accessed by a single module at a time. In one or more embodiments of the invention, the private field (301, 304) may only be cached in the sub-cache block (236.1, 236.N) associated with the module with privilege to access it. In one or more embodiments of the invention, the private field (301, 304) may have an optional write privilege.

In one or more embodiments of the invention, the data located in a 'read only' data field (302) may be accessible to multiple modules simultaneously, but cannot be altered. There may be multiple identical copies of the data stored within a read only field (302) cached in the sub-cache blocks (236.1, 236.2) of multiple modules simultaneously.

In one or more embodiments of the invention, the data located in a 'broadcast' data field (302) may be read by multiple modules simultaneously, but may only be written by one module. In one or more embodiments of the invention, the data of a broadcast field (302) is cached on multiple modules simultaneously, with only one of the modules privileged to write the broadcast field (302). The privileged module is configured to broadcast any changes made to the local copy to the additional modules with cached copies of the broadcast field (302).

In one or more embodiments of the invention, the data located in a 'public' data field (302) may need to be written and read by all modules simultaneously. In one or more embodiments of the invention, the public field is not stored in the module-specific sub-cache blocks. In alternative or additional embodiments, the contents of a public data field (302) may be divided and stored within various sub-cache blocks (236) of the distributed cache as though the contents were other types of data fields (302). Alternatively or additionally, the modules may include functionality to perform the same tasks using data structures that represent slightly different data from that which was originally used in the public field (302). The data structures may be stored in other types of data fields within the various sub-cache blocks (236). In one embodiment of the invention, the data that would have been stored in the public data field (302) is generated as needed using the different data.

In various embodiments of the invention, a QP state (300) may include any number of data fields (301, 302, 304) in any combination of the described categories. The combination used may vary depending upon the metadata requirements of the particular system being used. Further, in one or more embodiments of the invention, the data of a QP state (300) may be organized into alternate, altered, or additional types of data fields (302). These unmentioned data fields (302) may be defined based on expanded or alternate characteristics of the data being stored, or may be different groupings of the same data based on the altered requirements of the system.

In one or more embodiments of the invention, the categorization of the data fields may be by the HCA or maintained in main memory. For example, main memory may include an identifier of the permissions associated with each data field. Alternatively or additionally, the categorization may be implied. For example, for each data field, the HCA may be configured to distribute the data field, use the data field, and perform any required sharing according to the permissions. For example, the hardware of a module of the HCA may be configured to automatically notify another module of changes to a particular data field even though the category of the particular data field is not expressly listed or otherwise expressly associated with the particular data field.

Figure 4:
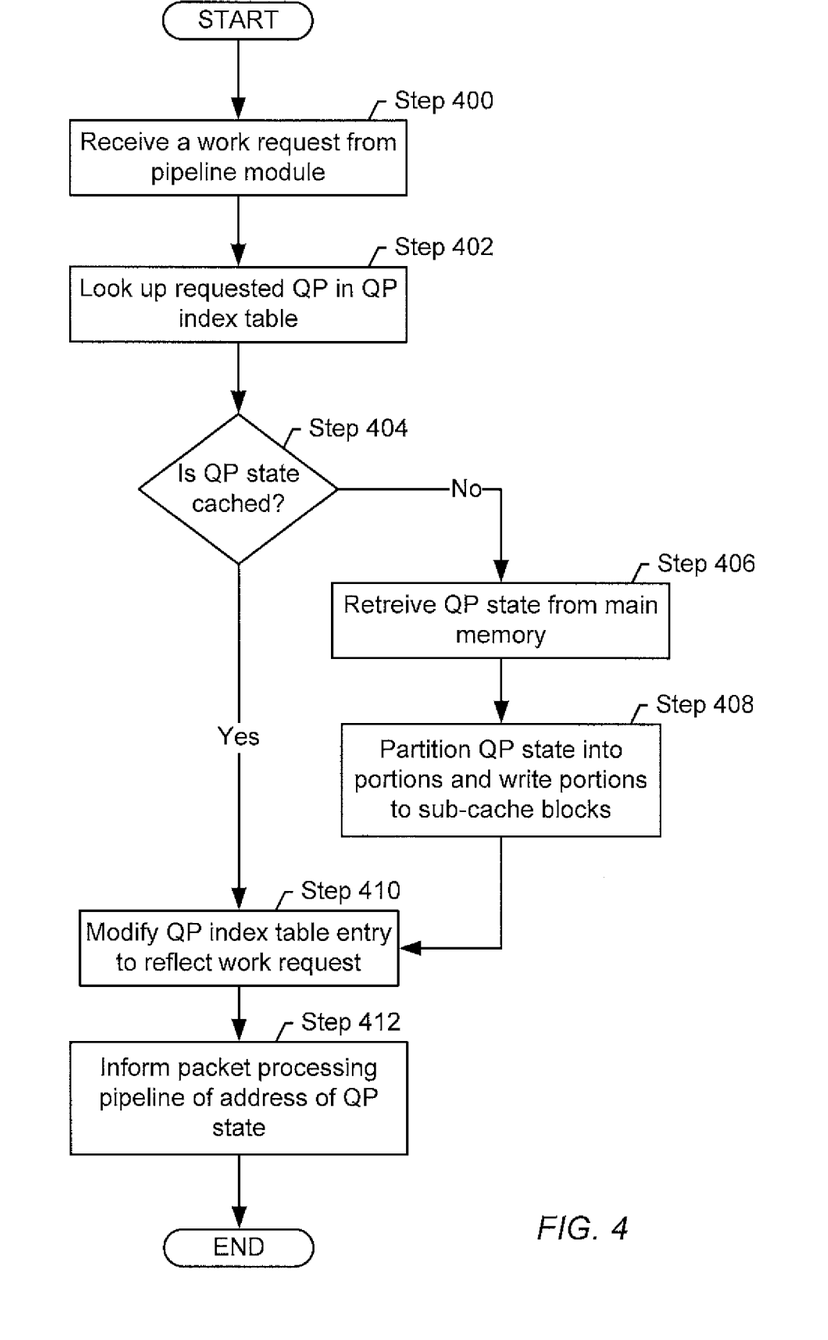
FIGS. 4-5 show flow charts in accordance with one or more embodiments of the invention.

FIG. 4 shows a method for managing the distributed cache in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 400, the cache control module receives a work request from a module in the HCA pipeline. A work request indicates that the HCA pipeline will be handling traffic on a certain QP, and thus the QP state associated with that QP will need to be made available to the HCA pipeline. The work request includes a QP number by which both the QP and QP state are identified. In one embodiment of the invention, the work request may originate in the host system, or in a device driver of the HCA. The work request may be passed to modules along the pipeline as they are needed to perform tasks. The work request may not be passed directly to the cache control module, which may receive the access requests from the RQS Module, if the QP is being used for outgoing network traffic, or from the IBPR Module, if the QP is being used for incoming traffic. The access request may take the form of a QP index lookup. In one or more embodiments of invention, other pipeline modules may request access to a QP state as well.

In Step 402, an index entry associated with the requested QP is queried in the QP index table. In one or more embodiments of the invention, the QP index table is queried using the QP number to obtain the QP index of the entries in the distributed cache in which the QP state is located. In one or more embodiments of the invention, the QP index table is accessed by the cache control module using the QP number provided in the work request, and the entry is then retrieved by the cache control module. Alternately, the entry may be retrieved by the pipeline module, which sent the work request.

In Step 404, a determination is made as to whether the requested QP state is currently in the distributed cache. In one or more embodiments of the invention, determining whether the requested QP state is in cache may include determining whether the QP number of the requested QP state is in the QP index table. If the QP index table includes an index entry having the QP number corresponding to the requested QP, then the QP state is cached, and located in sub-cache block entries associated with that QP index number specified by the index entry.

In Step 406, if the QP state is not currently cached, the QP state is retrieved from memory. In one or more embodiments of the invention, the address of the QP state within main memory is indexed in an address table located in the distributed cache. Alternately, a function may be performed using a predefined structure of the QP states within memory to obtain the address. The QP state may be read directly from main memory into the distributed cache. Portions that are required for different modules may be read independently, and written directly to the sub-cache block associated with the correct module, or it may be read into an intermediate address in the central cache block.

In Step 408, the QP state is partitioned into portions and the portions are written into the appropriate sub-cache blocks in one or more embodiments of the invention. Step 408 may occur in parallel with or after Step 406. The QP state is divided into atomic data fields, which are written into the sub-cache blocks according to what is required by the different pipeline modules. Some data fields may only be written to a single sub-cache block, and some data fields may be duplicated across many sub-cache blocks. The sub-cache blocks may be further divided according to access permissions. For example, data stored in a private field may be written into a portion of a sub-block cache that is only accessible to its given module, and data that is in a broadcast field may be written into a portion of the sub-block cache that can be accessed by other modules in the pipeline as required. Public fields may be split up into other types of data fields and distributed to the sub-cache blocks in which they are required. Alternatively, or additionally, a specific set of data fields associated with a specific public field, some of which may not be included in the public field, are written into the various sub-cache blocks.

In one or more embodiments of the invention, the sub-cache block(s) in which a data field is to be stored may be predefined within the distributed cache. For example, data field A is always stored in sub-cache 1, data field B is always stored in sub-cache block 2 and sub-cache block 3. The distribution of the data fields may also be predefined according to the intended use of the QP. Alternately, each of the pipeline modules may request a specific portion of a QP state that it requires. In one or more embodiments of the invention, the division of the QP state may be specified by metadata associated with, or stored within the QP state itself.

In order to write the QP state into the distributed cache, eviction of a currently cached QP state may be required. In one or more embodiments of the invention, which QP state to evict is determined by checking the reference counter in the index entries of presently cached QP states. The reference counter may be used since QP states that have no pending work requests may be preferable candidates for eviction. Alternately, the cache control module may track usage of QP states in the cache, and evict based on frequency of use, or time elapsed since last use. Other cache eviction algorithms may be used without departing from the scope of the invention.

In Step 410, the QP index table is modified to reflect the work request. If the QP state was already cached, the reference counter located within the index entry associated with the QP state is incremented. The reference counter keeps track of the number of pending work requests for the QP. The reference counter may be decremented after the work request has been processed. If the QP state had to be retrieved from memory, and a cached QP state evicted, then the index entry associated with the evicted QP state is changed to reflect the information of the newly cached QP state.

In Step 412, the QP index number of the QP state is disseminated to the pipeline modules. In one or more embodiments of the invention, which modules require which data fields of the QP state is maintained by the cache control module. Specifically, the cache control module may store the data fields in the corresponding sub-cache blocks of modules that use the data fields. Which modules require which data fields may be maintained in hardware, firmware, or a combination thereof in one or more embodiments of the invention.

In one or more embodiments of the invention, the pipeline modules may be actively informed of the QP index number of the QP state within the distributed cache immediately after the work request is received and the QP state located within the cache. The QP index number of sub-cache block entries in which the QP state is located is added to the meta-data associated with the work request, and carried through the pipeline along with along with the work request. Alternatively, the modules may query the index, or cache control module, to obtain the location of a QP state as the QP state is needed.

Figure 5:
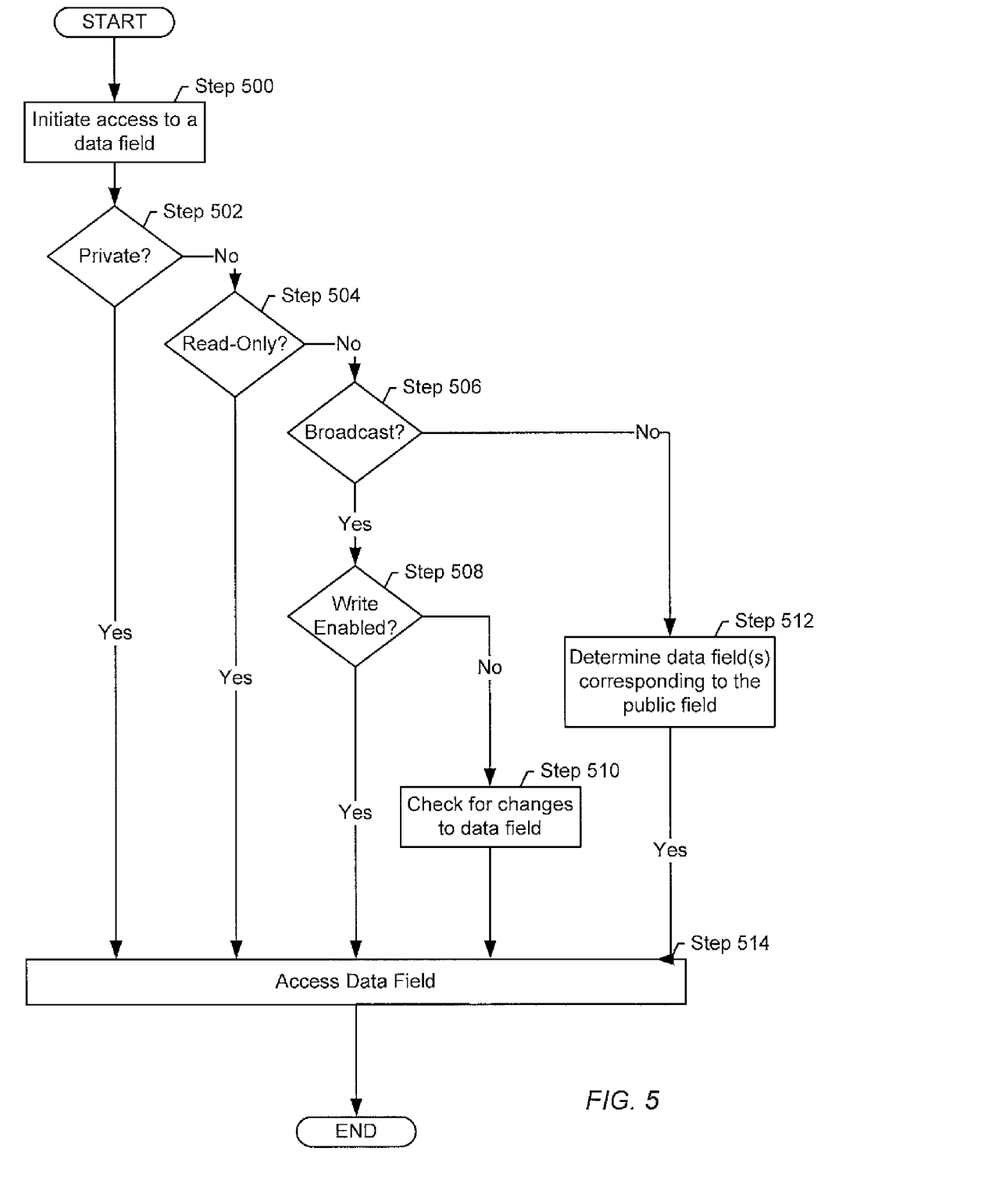

FIG. 5 shows a method for the use of data fields in a distributed QP state in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 500, a module in the packet processing pipeline initiates an access to a data field. The data field may be cached within the local sub-cache block of the module or stored in the central cache block of the distributed cache. In one or more embodiments of the invention, the data field may be located within the sub-cache block of a different module in the pipeline, to which the module has access privileges. The module may have been previously aware of the location of the data field. Alternately, the module may have to look up the location in the distributed cache index, or request the location from the cache control module. The characteristics of the type of data field may also factor in to the location, in which case this step follows the determination of data field type.

In Steps 502-506, a determination is made as to what type of data field is required by the module. Specifically, in Step 502, a determination is made whether the data field is private. If the data field is private, then only the module has access to the data field, and the data field is located in the local sub-cache of the module. In one or more embodiments of the invention, the sub-cache block may be divided into further sub-blocks based on permissions, in which case the private field will be located in a block that is private to the module. In one or more embodiments of the invention, a module may be require additional permissions in order to alter the data stored in a private field. A permission to write the data field may be implicit to the use of the data, or may require the module to check and obtain permission before modifying the flag.

In Step 504, a determination is made whether the data field is read-only in one or more embodiments of the invention. If the data field is read-only, then every module may have unlimited access to read its contents. The read-only field may be stored in the local sub-cache block of the module or in the central cache block. The location of the read-only field may be fixed based on the implementation of the invention, and may vary depending on how the data is used, expected demand, performance optimization, and the limitations of the system. In one or more embodiments of the invention, the location of the field may be dynamic and based on situation specific variables. The rules governing location may vary for different fields in the same implementation.

In Step 506, a determination is made whether the data field is a broadcast field. If the data field is a broadcast field, the multiple modules may have access to it, but only one field has permission to write it. In Step 508, a determination is made whether the module has permission to write to the data field. If the module has permission to write to the broadcast field, then no other module will have modified it, and the data in the field will implicitly be up-to-date and the module is free to access the data within the broadcast field. In one or more embodiments of the invention, if contents of the data field are modified by the access, then the module broadcasts the altered data field to additional modules which have the data field cached. The additional modules may then update their respective cached versions to reflect that of the broadcasting module. Methods by which this might be achieved are discussed in Step 510 below.

In Step 510, if the module is accessing the broadcast field, but does not have write permissions, then a different module implicitly does and the broadcast-receiving module must verify that the data in the cached field is up-to-date. In one or more embodiments of the invention, the modules may be configured to communicate directly, and upon making any changes, the broadcast-receiving module may broadcast the change to the remainder of the modules, which require the field. In one or more embodiments of the invention, the broadcast may simply be an alert that the contents of the field have changed. Alternately, or additionally, the broadcasting module may be configured to access the cache of other modules and change their contents directly, and Step 510 may be omitted. Alternately or additionally, the field may be cached centrally or broadcast-receive modules enabled to access the field within the sub-cache block of the broadcasting module. In such a scenario, a locking system or access queue for that data field may be implemented to control access to the data field. In one or more embodiments of the invention, the cache control module ensures that a current copy is maintained throughout the distributed cache. Specifically, the cache control module may receive the update from the module that wrote to the data field, and transmit the update to the remaining sub-cache blocks that have the data field.

In Step 512, if the data field is not private, read-only or broadcast, the data field is public. A public field includes data that is both written and read by multiple modules. In one embodiment of the invention, the sub-cache block associated with the accessing module stores a data field, or data fields, that store a subset of the data components within the public field. In this case, the separated components are accessed as though they were part of the public field. Access to the separated components may also be restricted by the rules governing access to the data field type of the component. Alternately, the data fields used in lieu of the public field may be distinct from the data stored in the public field These distinct data fields may be used to calculate the component data in additional data fields.

For example, if the public field stores a counter tracking requests on the pipeline. The counter is incremented by a first module when a request is received, decremented by a second module when a request is handled, and read by the remainder of the modules to determine the number of pending requests. Instead of a single public field, each module may instead use a data field with a counter relevant to a specific purpose. The first module has a counter tracking the number of requests received and the second module has a counter corresponding to handled requests. Both of these counter data fields are broadcast to the remainder of the modules, who calculate the pending requests by subtracting the handled counter from the received counter.

In Step 514, the data field is accessed by the module according to the specific rules of that type of field. In addition to the broad rules that categorize the field, each independent field may have additional rules governing access and use which are specific to that data field exclusively. These additional rules may be specified by the data field, or a module's ability to use the data field may be internally restricted.

Figure 6A:
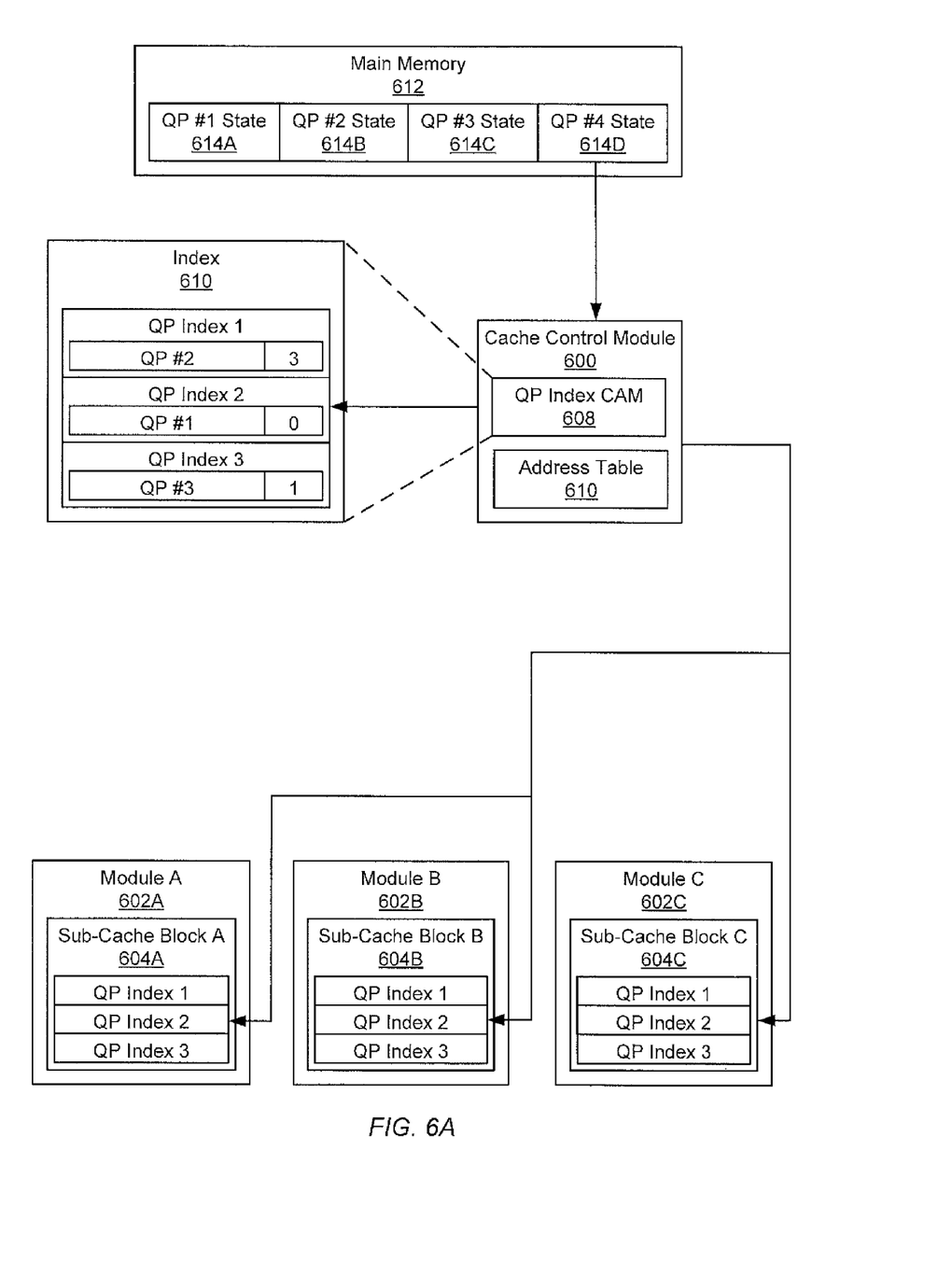
FIGS. 6A-6B show an example in accordance with one or more embodiments of the invention.
Figure 6B:
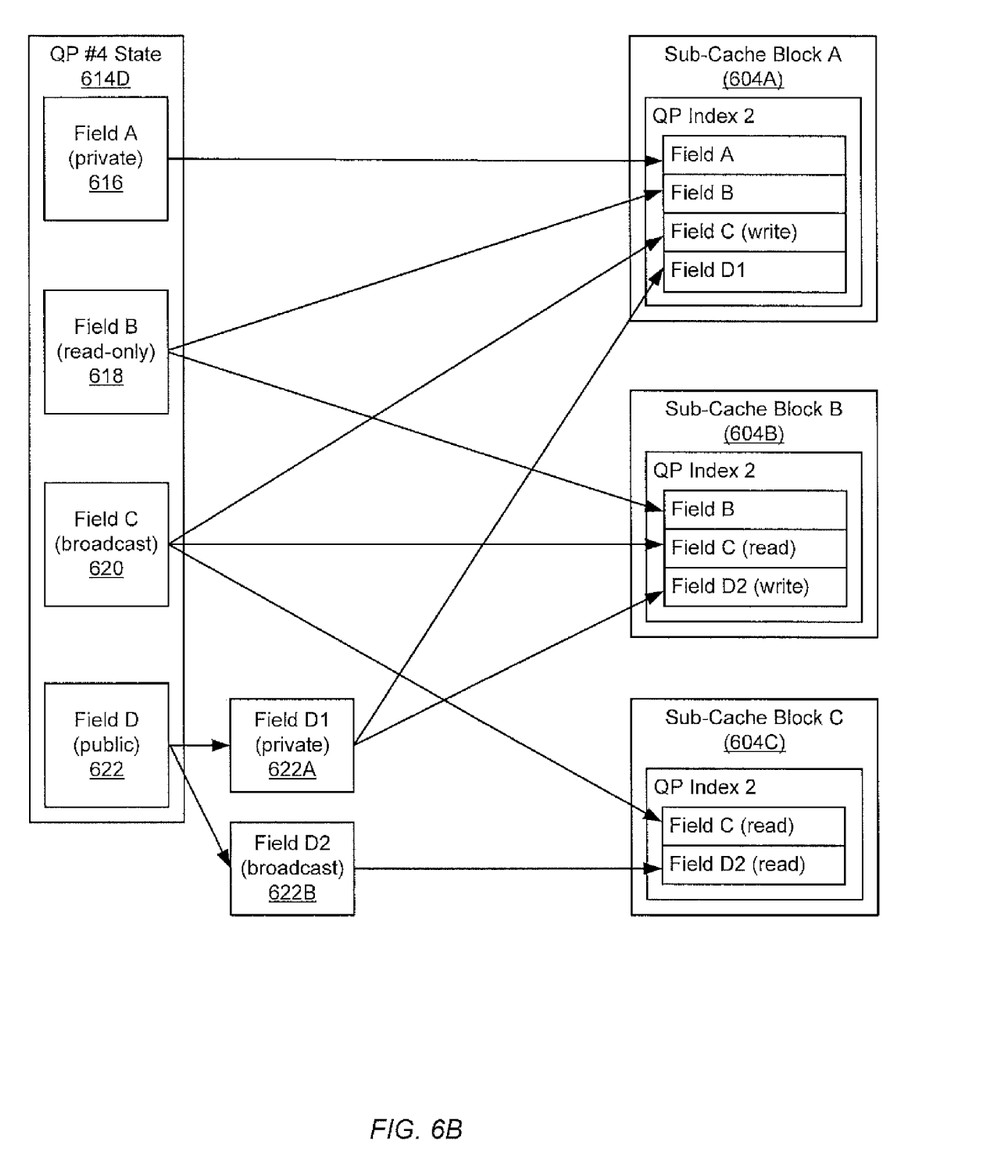

FIGS. 6A and 6B show an example of a distributed cache of a simplified version of the pipeline of the invention being managed in accordance with one or more embodiments of the invention. The following is for example purposes only and not intended to limit the scope of the invention.

The example is the operation of a simplified version of the packet processing pipeline of the HCA. In the simplified version, the packet processing pipeline may have generic pipelined modules (602), QP states, cache blocks (604, 606) and other components (not shown) required to implement one or more embodiments of the invention. Each of the sub-cache blocks (604) as well as the central cache block (606) has three entries, and there are four available QP states, each with five data fields.

A work request is received by the cache control module (600) from a first module (602A) in the HCA pipeline. The work request indicates that traffic is expected on QP #4 and access to the QP state (614D) for #4 is needed. The cache control module (600) queries the QP index table (608) using the QP number, #4. The QP index table (608) returns the entry within the QP index table (608) which is associated with QP #4. The index entry includes a QP index number of QP State #4 (614D) within the cache, and a reference counter, which tracks the number of pending work requests. The reference counter is incremented. The cache control module (600) infers from the QP index number that QP State #4 (614D) is not currently cached and ascertains the location of QP state #4 (614D) in main memory (612) by accessing the address table (610), which translates the virtual address used by the modules into the physical address within memory (612). As the distributed cache is currently fully occupied, a currently cached QP state (614) must be evicted to accommodate the new QP state (614D). The cache control module (600) checks the reference counters of entries in the QP index table to obtain a viable eviction candidate. As QP state #3 (614C), resident of Entry 2 in the distributed cache, has no currently pending work requests, QP state #3 (614*c*) is chosen. The QP index table (608) and address table (610) are updated to reflect the eviction of QP state #3. The cache control module (600) partitions QP state #4 (614*d*) into its component data fields as it is retrieved from main memory, and writes each of the data fields into the sub-cache blocks (604) associated with the modules (602) that require the data fields. This process is detailed in FIG. 6B.

QP states (614), in this example, include five fields (616-624). A private field (616) includes data that is only used by module A (602A); a read-only field (618) includes data that is required by modules A (602A) and B (602B); data in a broadcast field (620), is used by modules B (602B) and C (602C), but may be affected by certain actions performed by module A (602A); and a public field (622). The public field (622) includes a data item produced by modules B (602B) and consumed by module C (602C) and a second, distinct data item that is only used by module A.

The private field (616) is written into sub-cache block A (604A). Copies of the read-only field (618) are written into sub-cache blocks A (604A) and B (604B). The broadcast field is used by all three modules (602), and thus is written into all three sub-cache blocks (604). No flags or permissions are required for the broadcast field (620) in this case as the use of the broadcast field (620) is limited, and function of the modules (602) is known. Because the first (622) of the two public fields is used by two distinct sets of producing/consuming modules (602), the first public field (622) may be partitioned into sub-fields (622A, 622B). The sub-fields (622A, 622B) are dictated by rules associated with that specific field (622) rather than just public fields in general. In this case, a private field (622A), used only by module A (602 A) is written to sub-cache block A (604A) and a broadcast field (622B), used by modules B (602B) and C (602C), is written to sub-cache blocks B (604B) and C (604C) After the QP state (614D) has been written into the distributed cache, the QP index number associated with the Entry 2 is returned to the requesting module (602A).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a distributed cache of a host channel adapter (HCA), comprising:
    receiving a work request comprising a queue pair (QP) number;
    determining, by a cache control module of the HCA, that a QP state identified by the QP number is not in the distributed cache of the HCA,
        wherein the QP state comprises a plurality of data fields, and
        wherein the distributed cache comprises a plurality of sub-cache blocks;
    retrieving the QP state from main memory;
    identifying a first portion and a second portion of the QP state,
        wherein the first portion comprises a first subset of the plurality of data fields required by a first module of the HCA, and
        wherein the second portion comprises a second subset of the plurality of data fields required by a second module of the HCA;
    storing the first portion into a first entry of a first sub-cache block associated with the first module, wherein the first entry is identified by a QP index number, wherein the first sub-cache block is one of the plurality of sub-cache blocks;
    storing the second portion into a second entry of a second sub-cache block associated with the second module, wherein the second entry is identified by the QP index number,
        wherein the second sub-cache block is one of the plurality of sub-cache blocks; and
    returning the QP index number of the QP state to the first module and the second module.

2. The method of claim 1, wherein determining that the QP state is not in the distributed cache comprises:
    attempting to retrieve, from a QP index table, an index entry associated with the QP state, wherein the index entry comprises the QP index number of each entry in the plurality of sub-cache blocks in which the QP state is located within the distributed cache;
    determining that the index entry is not present within the QP index table.

3. The method of claim 2, wherein retrieving the QP state from main memory further comprises:
    obtaining a location of the QP state in the main memory from an address table;
    reading the QP state from the main memory.

4. The method of claim 2, further comprising:
    selecting, based on a reference counter in the QP index table, a resident QP state to evict, wherein the reference counter represents a number of pending work requests to evict; and
    evicting the resident QP state from the distributed cache.

5. The method of claim 1, wherein the plurality of data fields of the QP state comprises a private field, configured to be read and written by the first module, and wherein the private field is stored exclusively in the first entry.

6. The method of claim 1, wherein the plurality of data fields of the QP state comprises a read-only field, configured to be read by both the first module and the second module, and wherein a first copy of the read-only field is stored in the first entry and a second copy of the read-only field is stored in the second entry.

7. The method of claim 1, wherein the plurality of data fields of the QP state comprises a broadcast field, configured to be read by the second module and written by the first module, and wherein a first copy of the broadcast field is stored in the first entry and a second copy of the broadcast field is stored in the second entry.

8. The method of claim 7, further comprising:
    broadcasting, by the first module, a change made to the first copy of the broadcast field;
    receiving, by the second module, the change; and
    altering, by the second module, the second copy of the broadcast field to reflect the change.

9. The method of claim 1, wherein the plurality of data fields of the QP state comprises a public field, configured to be read and written by the first module and the second module, wherein only one module can write the public field at a given time.

10. The method of claim 9, wherein the public field is stored in a central cache block of the HCA.

11. The method of claim 9, further comprising:
    determining that the public field may be split into a plurality of non-public data fields;
    partitioning the public field into the plurality of non-public data fields; and
    storing the plurality of non-public data fields in the first entry and the second entry.

* * * * *